UNITED STATES PATENT OFFICE.

FEODOR BOAS, OF ST. HYACINTHE, CANADA.

COMPOSITION OF MATTER FOR WALL-PLASTER, &c.

SPECIFICATION forming part of Letters Patent No. 626,481, dated June 6, 1899.

Application filed September 21, 1896. Serial No. 606,570. (No specimens.)

*To all whom it may concern:*

Be it known that I, FEODOR BOAS, a subject of the Queen of Great Britain, residing at St. Hyacinthe, in the Province of Quebec, Dominion of Canada, have invented certain new and useful Improvements in Compounds of Matter; and I do hereby declare the following to be a full, clear, and exact description of the invention, such as will enable others skilled in the art to which it appertains to make and use the same.

My invention consists of an improved compound of matter to be used as wall-plaster and for other similar purposes.

The said compound results from a mixture of crushed chrysotile-bearing serpentine rock, heretofore a waste product in asbestos-mining, and a small proportion of lime, with a sufficient quantity of water. The mineral chrysotile finds application in the arts as one of the forms of asbestos when it occurs of sufficient length of fiber. In mining the commercial chrysotile a large quantity of serpentine rock is of necessity removed and thrown upon the dump as waste material. Chrysotile is essentially a hydrated basic silicate of magnesia, and it generally occurs in nature as fibrous layers in massive serpentine, which chemical analysis shows to be of practically the same chemical composition as the fibrous mineral. The massive serpentine is then the gangue of the fibrous chrysotile. This massive serpentine gangue often contains small seams of chrysotile; but they are of too short fiber to find use as ordinary asbestos. This waste material accumulates at the mines and around the factories, and it is a trouble and expense to the industry. Many attempts have been made to utilize this waste, but previous to my invention without success. My invention therefore provides a useful outlet for this waste material. I have discovered that when this waste serpentine rock containing short-fibered chrysotile is crushed and mixed with quicklime in proper proportions and then a suitable amount of water added the silicate of magnesia and the quicklime react together chemically and a double silicate of lime and magnesia is formed. This double silicate of lime and magnesia acts as a cement and binds the mass of the material together, forming a light, flexible, and strong structure which possesses particular advantages as a wall-plaster and for similar purposes.

In carrying out my invention it is essential to use only a moderate amount of quicklime in order to get the full benefit of the binding properties of the double silicate of lime and magnesia as a cement. If a large proportion of lime is used, then much carbonate of lime will be formed during the setting of the plaster, and this dilutes and weakens the silicate cement. My plaster therefore differs from all other similar compounds in utilizing a double silicate of lime and magnesia as the chief binding material, and this double silicate is formed by the chemical interaction of hydrated basic silicate of magnesia and ordinary quicklime.

Although the massive serpentine and fibrous chrysotile differ so much in their physical condition, yet chemically they are practically of the same composition. The composition of the mass is about as follows: from thirty to forty per cent. of magnesia, thirty-five to forty per cent. of silica, nine to twelve per cent. of water, and small amounts of impurities. On crushing the rock the short-fibered chrysotile is broken up into short fibers and the massive serpentine becomes granular. The preferred proportion of parts is one part of lime to from six to ten parts of the crushed chrysotile-bearing serpentine rock, by weight, according to the purity of the lime, the purer the lime the less the quantity required. The proportions may be varied beyond these limits, however, in special cases. In place of lime may be used other material which would chemically combine to form a double silicate with the crushed chrysotile serpentine rock in the presence of water. A sufficient quantity of water should be used to slake the lime and to reduce the mixture of materials to a plastic mass. One method of combining these constituents is to mix the crushed chrysotile-bearing serpentine rock and lime or equivalent materials of the character mentioned and then add the necessary amount of water. The advantage of this method is that it produces a dry plaster which may be shipped to consumers ignorant of the necessary proportions of the constituent parts, and this prepared plaster can be wet up for use by any plasterer who has skill enough to know when his materials are of the right consistency to make a good job. The essential point, however, is to insure the mixing of the crushed chrysotile-bearing serpentine rock with the lime while the same is hot in the process of hydration, or as it is commonly termed "slaking," and this may be done with less labor and expense where it is to be immediately applied to the wall by first slaking the lime and then adding the crushed chrysotile-bearing serpentine rock in excess to the lime during this process of hydration or immediately thereafter. This saves the time, labor, and expense which would be otherwise consumed in crushing and screening the lime to the degree of fineness necessary to secure a perfectly even dry mixture of the lime with the crushed chrysotile-bearing serpentine rock. When the slaking of the lime is thus done in the presence of the crushed chrysotile-bearing serpentine rock or when the latter is added while the slaked lime is still hot from the process of hydration, the silica and magnesia of the crushed chrysotile-bearing serpentine rock become chemically combined with the lime, and as a result a double silicate of lime and magnesia is formed. Thus the resultant plaster, which I call "asbestic," is not a mere mechanical mixture or aggregation of elements, but it is largely the result of chemical interaction, producing a stable chemical compound. The wall-plaster thus formed combines lightness and flexibility with strength and density of structure. It is fireproof to the highest degree and will not crack or curl under the action of the heat and subsequent application of water. It is also susceptible of a fine surface finish and is a bad conductor of sound. As it is stronger than any other plaster, it is not necessary to have as thick a coating applied as usual, and additional economy, with a reduction of weight on the building, result. The plaster does not disintegrate with age and the action of moisture. On the contrary, it grows harder with age and exposure. It is of especial value in hospitals, sanitariums, &c. Nails can be driven through it without the material splitting or crumbling. It may be made into sheets, boards, or slabs and used like lumber by nailing it to the frame of a building.

Asbestic plaster being a bad conductor of heat, great economy in fuel results in the heating of rooms whose walls are covered with asbestic plaster. On the other hand, in summer the same non-conductivity of the plaster tends to keep the interior of the apartment cool to the extent of preventing the heat absorbed from the sun's rays on the roof and walls of the building from being conducted to the interior. It is, moreover, far more resistant to the action of acids than ordinary lime plasters, where the binding material is carbonate of lime. In fact, pieces of my plaster have been immersed in hydrochloric acid for several days without being entirely disintegrated, while such treatment applied to ordinary lime plasters would dissolve out all the cementing carbonate of lime and the plaster would be entirely disintegrated.

Having therefore described my invention, what I claim as new, and desire to protect by Letters Patent, is—

1. A composition of matter comprising silicate of magnesia, largely in excess, mixed with quicklime and water, substantially as described.

2. A composition of matter comprising silicate of magnesia cemented together by double silicate of lime and magnesia, substantially as described.

3. A composition of matter to form a wall-plaster comprising granular and fibrous silicate of magnesia cemented together by double silicate of lime and magnesia, substantially as described.

4. A composition of matter in which a double silicate of lime and magnesia is the chief binding agent.

5. A composition of matter to form a dry wall-plaster comprising comminuted silicate of magnesia, largely in excess, mixed with quicklime, substantially as described.

6. A slab of silicate of magnesia cemented together by double silicate of lime and magnesia, substantially as described.

7. A composition of matter consisting of crushed chrysotile gangue mixed with quicklime, substantially as described.

In testimony whereof I affix my signature in presence of two witnesses.

FEODOR BOAS.

Witnesses:
 CHAS. H. PATRICK,
 A. PARKER SMITH.